May 15, 1951         R. H. BAILEY         2,553,126
AUTOMATIC STEPLESS TRANSMISSION
Filed July 16, 1947                          2 Sheets-Sheet 1
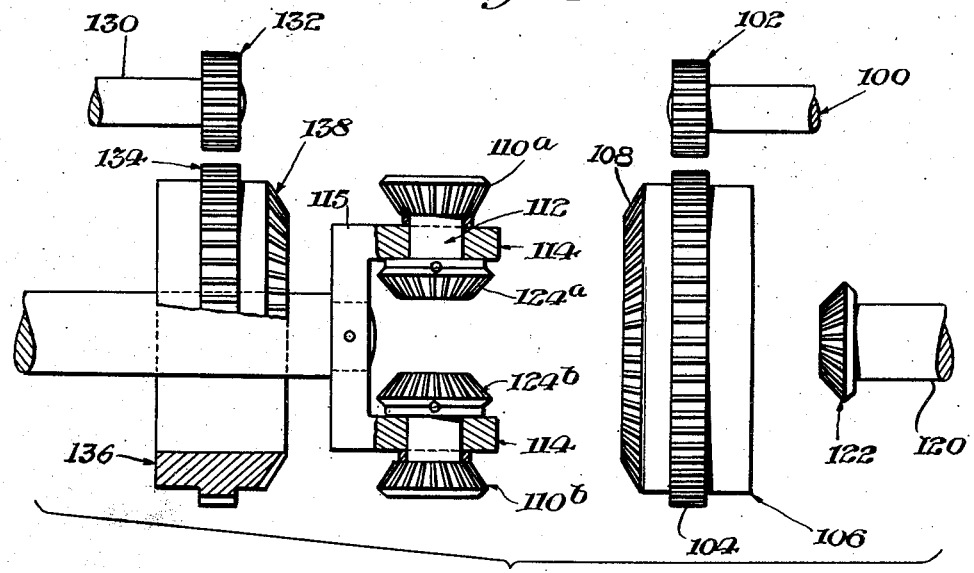
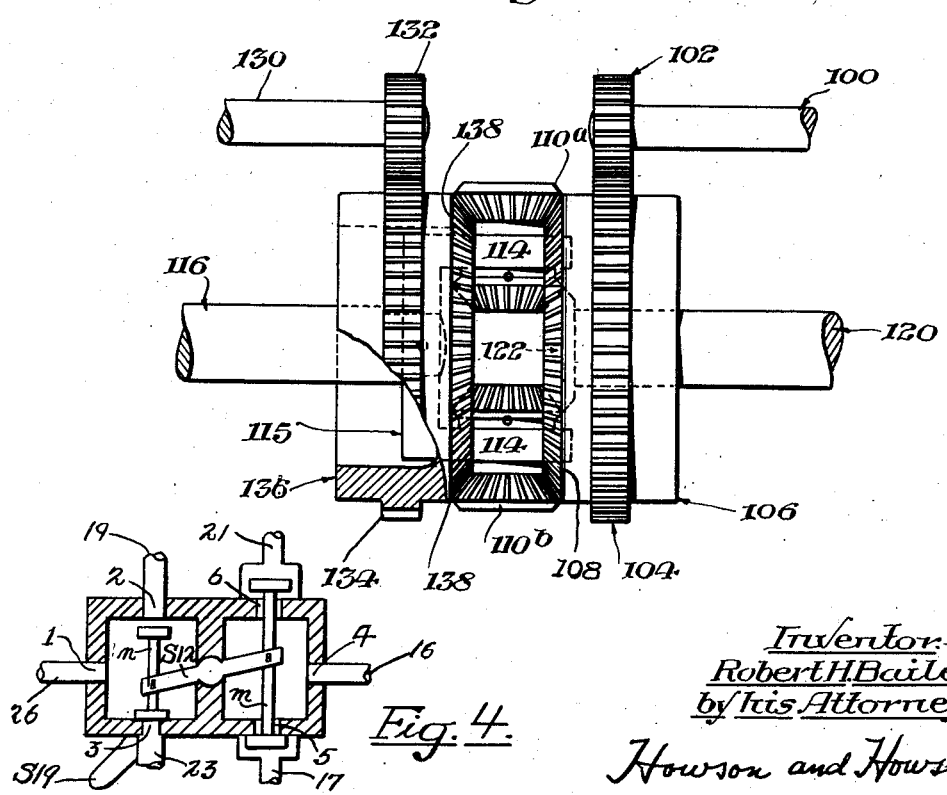
Inventor:
Robert H. Bailey
by his Attorneys,
Howson and Howson.

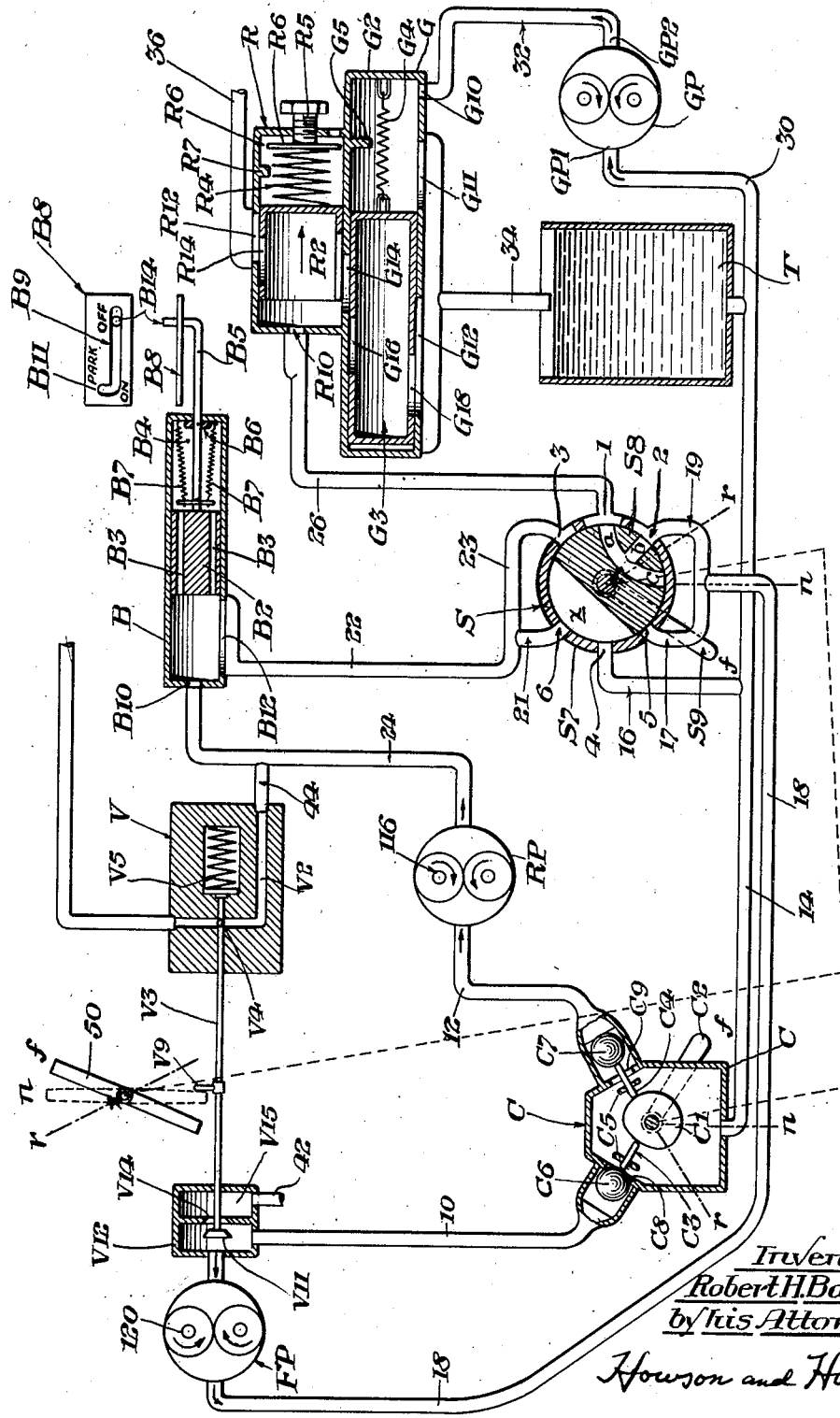

Patented May 15, 1951

2,553,126

UNITED STATES PATENT OFFICE 2,553,126

AUTOMATIC STEPLESS TRANSMISSION

Robert H. Bailey, Port Washington, N. Y.

Application July 16, 1947, Serial No. 761,272

5 Claims. (Cl. 74—752)

This invention relates to transmissions which can be used as a substitute for the conventional clutch of the modern automobile and at the same time as a substitute for the three or four speed transmission. The invention, however, is not limited to the use in connection with automobiles or with internal combustion engines. It may be used in connection with any prime mover whose power is to be smoothly transmitted through a number of speed ratios from the driving to the driven shaft without interruption.

It is an object of the invention to provide a transmission which is capable of an unlimited combination of power-to-speed ratios without interruption in the tractive force or in the transmission of the power from the driving to the driven shaft. A related object is to accomplish such variation in gear ratio smoothly and automatically to meet varying power demands and driving conditions.

One of the advantages of the invention is that the transmission can be shifted from forward to reverse or vice versa from any speed without any unmeshing of gears. Another advantage is that the transmission enables the engine to be used as a power brake when desired.

Along with the above mentioned advantages, the transmission has the further advantage that a dead car can be started by being pushed, as with conventional transmissions. At the same time a direct coupling between the engine and wheels or between the driving and driven shaft is maintained when the car is parked with the engine off. According to the invention only a three-position manual selector lever movable into forward, neutral and reverse positions is required.

In addition to the foregoing a finger operated brake to supplement the foot brake for parking may be operated without the necessity of the application of any measurable force as compared with the ordinary brakes now commonly used on the modern automobile.

Other objects and advantages of the invention will become apparent as it is described in the accompanying drawings.

In the drawings:

Fig. 1 is an exploded view of the gear members employed in the invention;

Fig. 2 is a view of the gear members illustrated in Fig. 1, but in assembled condition; Fig. 2 is partly broken away for clear illustration;

Fig. 3 is a diagrammatic illustration of the control apparatus employed in combination with the gearing mechanism illustrated in Figs. 1 and 2; and Fig. 4 is a diagrammatic illustration of a poppet type selector valve which may be used in the control apparatus of the invention.

Referring particularly to Fig. 1 of the drawings, there is shown in diagrammatic form a driving shaft 100 which may be coupled in any conventional fashion with a gasoline engine, a Diesel engine or any other sort of engine or motor which may require a transmission mechanism to transmit the power from the driving shaft to a driven shaft. The invention will be described as if embodied in an automobile, but it should be understood that the invention is not so limited.

Although spur gears are illustrated and referred to in the following description it will be understood that spiraled, beveled or any other common gear forms may be used.

On the driving shaft 100 is a spur gear 102. The gear 102 meshes with a much larger spur gear 104 on the periphery of a cylindrical member or drum 106 which is thus driven by the gear 102 when the driving shaft rotates. At one edge of the member 106 are formed bevel gear teeth 108 which may mesh with the small bevel gears 110a, 110b. The gears 110a and 110b are formed integral with or mounted upon stud shafts 112 which are mounted in and rotate within the arms 114 of a U-shaped yoke 115. The yoke 115 is mounted upon and turns with a shaft 116. As will hereinafter appear, the shaft 116 controls the reverse rotation of the transmission.

In axial alignment with the shaft 116 is a similar shaft 120 having a bevel gear 122 on the edge thereof. The shaft 120 is coaxial also with gears 104 and 108 and the shaft 120 may pass through the center of the member 106. Meshing with the bevel gear 122 are bevel gears 124a and 124b which are mounted upon the opposite ends of the shafts 112 from the bevel gears 110a and 110b and on opposite sides of the yoke arms 114.

Coaxial with the shaft 116 is a gear 138 similar to the gear 108 on a cylindrical drum member 136 similar to the member 106. Also a large spur gear 134 similar to the gear 104 is formed on the member 136. The gear 134 meshes with a spur gear or pinion 132 mounted upon a driven shaft 130, which may drive the wheels of an auto, directly or through conventional differential or other gearing: Or any other mechanism may be driven.

If the driving shaft 100 is rotating at a constant speed in one direction it will drive the gears 104 and 108 also at a constant but slower speed.

*The neutral condition.*—As in the neutral condition of a common auto transmission with the auto stationary, the driving shaft is rotating in one direction at a constant speed, while the driven shaft is stationary. With this condition of the driving and driven shafts the forward control shaft 120 will rotate freely in the same direction as driving gear 104 but at a greater speed; the reverse control shaft 116 will rotate freely in the same direction as driving gear 104 but at a less speed than the driving gear.

Retardation of the above mentioned free rotation of either the forward control shaft 120 or of the reverse control shaft 116, selectively determines whether the auto will move forward or backward.

*The forward condition.*—When the forward control shaft 120 is slowed down to the same speed as the driving gear 104, the driven gear 134 and the reverse control shaft will be driven by a direct drive at the same speed and in the same direction as the driving gear 104.

If the forward control shaft 120 is slowed down somewhat but not so slow as the driving gear 104, the driven gear 134 will rotate in the same direction but at less speed than the driving gear. As the rotation of the forward control shaft decreases, the speed of rotation of the reverse control shaft will increase.

If the forward control shaft 120 is slowed down to a speed less than the driving gear 104, or is stopped, the driven gear 134 will rotate at a speed greater than and in the same direction as the driving gear, thus producing an overdrive condition which is maximum when the control shaft 120 is stopped. The amount of overdrive depends on dimensional relationships between gears 122, 108, 138, 124a and 124b and 110a and 110b. This relationship must be such that when driven gear 138 is stationary and driving gear 108 is rotated, the forward control shaft 120 will always rotate in the same direction as the driving gear 108 and at a greater speed than gear 108. Within the above conditions there are unlimited combinations possible to obtain the desired overdrive.

If A equals one-half the teeth on gear 108 and if B equals one-half the teeth on gear 122 and if C equals all the teeth on gear 110a and if D equals all the teeth on gear 124a then $$\frac{BC}{AD}+1$$

equals the revolutions of the driven shaft for $$1-\frac{BC}{AD}$$

revolutions of the driving shaft.

In order for the mechanism to operate as desired the product of one-half the number of teeth of forward control gear 122 (B) times the number of teeth on gear 110a or 110b (C) must always be less than the product of one-half the number of teeth on the driving gear 108 (A) times the number of teeth on gear 124a or 124b (D).

If BC is greater than AD then forward control shaft 120 will not rotate at a speed greater than driving gear 108 and there will be no overdrive.

*Example.*—If radius of gear 108=2 and radius of gear 122=½ and diameter of gear 110a=1 and diameter of gear 124a=1⅕

$$\frac{BC}{AD}+1=1\ 5/24$$

revolutions of driven shaft for $$1-\frac{BC}{AD}=\frac{19}{24}$$

revolutions of driving shaft.

*The reverse condition.*—When the forward control shaft 120 is allowed to rotate freely and the rotation of the reverse control shaft 116 is retarded, the driven gear 134 begins to rotate in the opposite direction to the driving gear 104, i. e. in "reverse" direction. The more the reverse control shaft is retarded, the more the speed of the driven gear 134 increases, in "reverse" direction.

When the rotation of the reverse control shaft is stopped, there is a direct reverse drive condition.

There is no overdrive in reverse because the driving and driven gears are in mesh with pinions 110a and 110b which in this condition rotate about stationary axes. Hence, the driving and driven gears can only rotate at the same speed.

The operations under conditions subsidiary to the three main conditions may be more easily understood after the remainder of the invention is described. Such subsidiary conditions include (under forward condition) acceleration, deceleration, coasting, pushing when the engine is stopped (dead battery) and (under neutral condition) tending to roll down hill when the engine is stopped, with the car facing up hill or facing down hill.

From the foregoing it will be understood that by limiting the rotation of the forward control shaft 120 and the reverse control shaft 116, the direction and speed of rotation of the driven shaft 130 can be controlled. The necessity to provide a means for smoothly and automatically regulating the speed of rotation of these control shafts will now also be apparent.

In the embodiment of my invention herein illustrated, the retardation of rotation or control of the rotation of the control shaft is accomplished by the use of positive displacement hydraulic pumps, such as conventional gear pumps. Referring to Fig. 3, the forward control pump FP has its shaft coupled to the forward control shaft 120, illustrated in Figs. 1 and 2. This coupling may be through gears or it may be accomplished by mounting the pump gear of the forward control pump upon the same shaft as the gear 122. In like manner a reversing pump RP is coupled positively with the reverse control shaft 116.

A third pump GP, termed for convenience the governor pump, is connected directly to the engine or source of power, the transmission of which it is desired to control. This pump GP may, like the other pumps, be of conventional gear form.

I. SELECTION OF FORWARD, NEUTRAL OR REVERSE

For the purpose of selective control of the output and action of the forward and reversing pumps I have provided a selctor valve S and a cam unit C.

(i) *The cam unit*

The cam unit is illustrated as comprising a casing from which conduits 10 and 12 go respectively to the inlet side of the forward pump FP and reversing pump RP. The conduit 12 goes directly to the reversing pump while the conduit 10 goes to the forward pump through a valve chamber as hereinafter more fully described. For the purpose of preventing reverse rotation of the pumps FP and RP, ball-check valves are provided in the conduits 10 and 12. These ball-check valves are operated by the cam C—1 located within the chamber of the cam unit C. The cam C—1 is mounted upon a shaft which extends outside the casing of the cam unit. The shaft may be operated by a lever C—2 or in any convenient fashion. Rectilinearly movable push-rods C—3 and C—4 are suitably guided, such as by bearing elements C—5 within the cam unit. Ball-checks C—6 and C—7 are located respectively in conduits 10 and 12 and one or the other is adapted to seat against ports C—8 and C—9 respectively in the casing of the cam unit when permitted to do so by the positioning of the push rod C—3 and C—4 when the cam C—1 is turned into forward or reverse position. The cam C—1 has a low point so that when the cam is in forward position, as illustrated in Fig. 3, the push rod C—3 will be against the low point and will be retracted. Hence the ball-check C—6 may seat in the port C—8; but the push rod C—4 will engage the higher periphery of the cam so that the ball-check C—7 will be pushed from its seat C—9. When the cam is rotated to the reverse position, the opposite condition will be attained. When the cam is in neutral position between reverse and forward positions, both of the ball-checks will be maintained off their seats by reasons of the push rods being both pushed outwardly by their being engaged with the high surface of the cam C—1.

The cam unit C is connected to a fluid reservoir T by a conduit 14. By means of the cam and push rods the only ball allowed to seat itself is the ball of that pump whose output is being controlled. This allows the pumps FP and RP to rotate backward when the selector valve is in the reverse or neutral or in the forward or neutral positions respectively.

*(ii) The selector valve*

The selector valve S may be of suitable form. For convenience of illustration, a rotary valve is illustrated in Fig. 3 which has six spaced ports 1—6 inclusive, in a cylindrical valve housing S—7. The valve ports are or may be approximately of the size and spacing shown in Fig. 3. In the embodiment illustrated the valve cylinder S—8 may be rocked from the neutral position $n$ to the left into forward position $f$ (the position of Fig. 3) or to the right about 45° into the "reverse" position $r$. There is a passage in the valve cylinder having three branches. The three branches communicate with ports 1, 2 and 3 when the valve is in the neutral position. There is also in the valve cylinder another larger passage $x$, which communicates with and connects or joins the ports 4, 5, 6 in neutral position.

The valve cylinder S—8 may be operated from outside the housing by an operating lever S—9. When the lever S—9 is moved into the forward position, i. e. about 45° to the left from neutral, the passage $x$ will afford communication between the ports 4 and 6; and the branches $a$ and $b$ will communicate with the ports 1 and 2 respectively. Ports 3 and 5 will be closed by the valve cylinder.

When the lever S—9 is moved to the right into the "reverse" position, the pasage $x$ will afford communication between the ports 4 and 5; and the branches $b$ and $c$ will communicate with the ports 3 and 1 respectively. The ports 2 and 6 will be closed.

The port 4 is connected by a conduit 16 to the reservoir T. The ports 2 and 5 are connected by conduits 17, 18 and 19 to the outlet port of the forward pump FP. The ports 3 and 6 are connected by conduits 21, 22 and 23 to a brake cylinder, hereinafter described, which in turn connects with the outlet of the reversing pump by a conduit 24. The port 1 connects with a regulator valve R hereinafter more fully described, by a conduit 26.

From the foregoing it may be observed that when the valve is in the forward position the forward pump FP is connected with the regulator R by means of conduits 18, 19 and 26. At the same time the reversing pump is connected through the brake B by the conduits 22, 21 and 16 to the reservoir T.

When the valve is in the reverse position the reversing pump RP is connected by conduits 22, 23 and 26 to the regulator R while the forward pump is connected by conduits 18, 17 and 16 to the reservoir T.

In Fig. 4 (in which like reference characters indicate equivalent parts of other figures) a poppet type selector valve is illustrated. This type of valve is suited for use as a selector valve in this invention because it is particularly adapted to meet the following conditions of operation. It is important when one of the control shafts is in the process of being selected by operation of the selector valve, that the other shaft have complete freedom. It is also important that during the "selection" or manipulation of the valve no restrictive conditions be set up which would override the function of the regulator. Hence there must be no interval during which the valve ports are blocked entirely or almost entirely. It is preferable that new connections be established fully before there is a substantial limitation upon and cutting off of the previous connection.

These conditions must be satisfied regardless of the type of valve employed. Within these limits rotary, poppet or other valves in various forms (of which those in Figs 3 and 4 are merely examples) may be used.

In Fig. 4 the poppets $m$ and $n$ are connected together by a connecting bar S—12 pivotally mounted at its mid point in a partition which divides the case into two chambers. There may be a pin and slot or other suitable connection between the stems of the poppets and the arms of the connecting bar. The connecting bar may be operated from outside the valve housing by a lever S—19 equivalent to the lever S—9 in Fig. 3. The heads on the poppets control the opening and closing of the ports 2, 3, 5 and 6.

II. CONTROL OF SPEED AND POWER

To control the speed and power transmitted I have provided the governor pump GP, a governor G and a regulator R.

*(i) The governor pump*

The governor pump GP has its inlet port GP—1 connected by a conduit 30 with the reservoir and its outlet port GP—2 connected by a conduit 32 to a governor G. The governor pump, being coupled with the engine, increases or decreases the flow of fluid through the system as the engine speeds up or slows down.

*(ii) The governor*

The function of the governor is to make the regulator ineffective at idling speeds or below.

The governor G comprises a casing G—2 which may be of cylindrical form or of any other convenient form. A hollow piston G—3 slides within the casing G—2 and is normally urged toward one end of the casing by a tension spring G—4, one end of which acts upon the piston while the other acts upon the casing G—2. The travel of the piston G—3 to the right in Figure 3 is stopped by a stop member G—5 extending from the casing wall into the path of movement of the piston. Leading into the space between the end of the piston (right end in Fig. 3) when the piston is resting against the stop G—5 and the adjacent end wall is a port G—10 to which the conduit 32 connects from the governor pump.

In accurately spaced positions along the casing G—2 are two other ports G—11 and G—12 which are connected by a common conduit 34 to the reservoir T. The port G—11 may be of T shape with its leg portion so placed with relation to the stop G—5 that when the piston G—3 rests against the stop only the leg portion of port G—11 will be partly open. Thus, when the engine is idling and the governor pump is rotating slowly, the fluid from the pump may pass through the partially open port G—11 and returns to the reservoir through the conduit 34 without affecting the position of the governor piston.

It will be observed that when the governor pump is speeded up by the acceleration of the engine, the increased fluid supply and pressure to the governor through the conduit 32 will cause the piston G—3 to move overcoming the tension of the spring G—4.

The governor spring G—4 is only strong enough to affect the position of the governor piston during idling speeds. At all speeds above idling the governor piston is moved into and remains in fully extended position.

By reason of the T shape of the port G—11 excessive pressure against the piston G—3 is avoided, since the port opening enlarges greatly as the head of the T is uncovered by the piston movement.

In another wall, for example in the upper wall of the casing G—2, there is a fourth port G—14. The port G—14 communicates with the governor as well as with the regulator R located above the governor as will hereinafter be described. The governor piston, however, controls the communication through the port G—14 to the governor. For this purpose a valve opening G—16 is provided in the wall of the governor piston. This passage G—16 may be of the same size and shape as the port G—14. When the governor piston is in the idle position, namely, when urged by the spring G—4 against stop G—5 the passage G—16 will be in register fully with the port G—14.

A valve passage or opening G—18 in the bottom wall of the governor piston communicates with the hereinbefore mentioned bottom port G—12 which is approximately twice as large as the valve passage G—18. The passage G—18 and the port G—12 are in communication therefor at all times in the embodiment illustrated. It will be understood, however, that the size of the passage G—18 and the port G—12 may be varied so long as it allows full and free discharge of all liquid entering within the governor piston. Thus, return of such liquid freely to the reservoir under all conditions is permitted.

From the foregoing it may be observed that movement of the governor piston (as required by the increase in flow of fluid from the governor pump when the engine is speeded up) cuts off entirely, the flow of liquid from the regulator R through the governor piston to the reservoir T. It thus makes the regulator effective at all speeds above idling speeds.

(iii) *The regulator*

The regulator R comprises a casing which may be cylindrical in shape having a cylindrical piston R—2 which is hollow and open at one end. If desired, the casing of the regulator may be mounted on the casing of the governor. The piston R—2 slides within the regulator casing and is normally urged to the left in Figure 3 by a compression spring R—4 acting upon one side of the head of the piston R—2. The other end of the spring R—4 may have its position adjusted to thereby adjust the tension of the spring and the pressure which will have to be overcome for a given movement of the piston R—2. The adjustment means may comprise a screw bolt R—5 threaded through a tapped opening in one end of the casing of the regulator. An enlarged head R—6 may afford a seat for the spring and may be attached if desired to the end of the screw bolt R—5. To limit the movement of the piston R—2 as it tends to compress the spring R—4 a stop R—7 may be provided extending into the casing of the regulator in the path of movement of the piston.

The port G—14 between the regulator and the governor is unrestricted by the movement of the piston R—2 in any position thereof. In addition to the port G—14 from the governor into the regulator, there are other ports R—10 and R—12 leading elsewhere. The port R—10 communicates through the conduit 26 with the selector valve S and is located preferably in the opposite end of the casing from the spring and adjustment screw bolt R—5. The port R—12 is located preferably on the opposite side of the regulator casing from the port G—14, but it may be located elsewhere.

The port R—12 has the degree of its opening controlled by a valve passage R—14 through the top wall of the piston R—2. The port R—12 and the passage R—14 are or may be the same size. The passage R—14 is so located in the piston R—2 that when the piston R—2 is against the stop R—7 the passage R—14 will be fully in register with the port R—12.

When the piston R—2 is in the opposite position, namely, when the spring R—4 has fully expanded and moved the piston into the left end of the regulator housing, the port R—12 will be completely closed because the passage R—14 will have passed beyond the port R—12 and the wall of the piston will close off the port R—12.

From the foregoing it may be observed that when the selector valve S is in the forward position and the governor pump is speeded up by reason of the acceleration of the engine, the pressure upon the governor piston G—3 will cause it to move gradually into a position somewhat as illustrated in Fig. 3. Such movement will completely close the port G—14. This gradual blocking off of the escape path from the regulator through the governor, allows the regulator to take over gradually and without shock. As soon as the engine has reached a speed above idling the governor has done its job and does not function again until the engine speed drops down to idling. Then, the governor piston returns to its stop G—5 and the regulator becomes ineffective because flow, still coming from the selector valve, escapes through the governor ports G—14 and G—12 to the reservoir.

The increase in pressure from pump FP by way of the selector valve S and conduit 26 when the engine speeds up and the governor ports close will cause the piston R—2 to move to the right (in Fig. 3) against the pressure of spring R—4 thus causing the port R—12 to be more fully opened by reason of the passage R—14 coming more fully in register therewith.

As port R—12 is more fully opened less retarding effect is produced on pump FP and shaft 120 whose speed may then increase, resulting in a greater speed ratio of driving to driven shaft. As the load on the engine decreases the spring R—4 gradually overcomes the pressure of the fluid entering port R—10. Thus the piston R—2 is moved by the spring R—4 and lessens the size of the passage R—14. This causes greater back pressure on pump FP and slows down shaft 120 thus creating a smaller speed ratio of driving to driven shaft.

The fluid from the regulator may return to the reservoir through a conduit 36 connected with the port R—12.

It will thus be apparent that by a greater or less acceleration of the engine or a greater or less load imposed, the amount of back pressure against the pump will be increased or decreased and thus there will be a varied retarding effect upon the forward control shaft 120.

The port R—12 is of such size and shape (for example of T shape) that when the regulator piston is at the extreme right against its stop the orifice is large enough to handle the entire output of the forward pump or the reversing pump even when they are operating at their maximum speeds. By this means when too great a load is placed on the engine which it is unable to cope with, the regulator piston will advance to the extreme right against its stop. In this condition the car will not move even though the engine is running but will function as if it is in neutral. This feature will prevent structural failures when overload conditions are reached. As soon as the load is decreased sufficiently the compression spring R—4 will just begin to move the regulator piston to the left closing the ports R—12 thus putting the transmission in operation as previously described.

When the selector valve is in the reverse position, the regulator will be connected with the reversing pump RP by the conduit 26, the selector valve S, the conduit 22, the brake and the conduit 24. Thus the speed of the transmission and power passed from the engine to the driven shaft will be regulated by the same means as was employed in the forward control.

III. THE BRAKE

The brake B is located between the reversing pump RP and the selector valve S. It may comprise a casing, preferably cylindrical in which slides a piston B—2. At one end of the casing a port B—10 connects with the conduit 24. In the side wall of the casing adjacent the port B—10 is another port B—12 connecting with the conduit 22. The port B—12 is preferably in the form of a slot so as to gradually have its exposed area diminish as the piston B—2 moves toward the end of the casing (the left end in Fig. 3). The full open area of the port B—12 preferably will be approximately equal to the area of the port B—10. Connected with the piston is a rod B—5 extending out the opposite end of the brake housing (the right end in Fig. 3). In order to limit the stroke of the piston, a stop member B—6 is fixedly mounted upon the piston rod B—5 within the brake housing. By reason of the limitation of the stroke of the piston, a chamber B—4 is provided in the right end of the brake housing as viewed in Fig. 3 between the end of the piston and the end wall of the brake housing. Within this chamber are tension spring B—7 connected with the end wall of the brake housing and also with an anchor pin fixedly attached to the piston rod B—5. The springs B—7 tend to constantly urge the brake piston and piston rod so as to engage the stop B—6 against the right end wall of the brake housing. In order to equalize the pressure on each side of the piston B—2, equalizer holes or passages B—3 are drilled through the piston parallel to its axis.

A handle B—14 may be provided on the outer end of the piston rod extending through a slot B—9 in a guide plate B—8. At one end of the slot B—9 there may be an offset recess B—11 into which the handle B—14 may be moved when it is desired to put the brake in parking position. By means of the handle portion B—14 the equalized brake piston may be moved easily into any desired position by hand against the tension of springs B—7. When the brake is in the parking position, or in other words, at the left end of the slot in the guide plate B—8, the piston B—2 will have completely closed off the opening of the port B—12. In other positions of the brake between this extreme brake-on position and the brake-off position as illustrated in Fig. 3, the brake will be partially on and will exert a braking force in accordance with its position.

IV. THE BY-PASS VALVE

It is desired to have the brake operative only under two conditions: When the selector valve and cam unit are in the reverse position; and, when the car is coasting and the wheels tend to drive the engine.

For that reason a by-pass valve V is provided between the brake B and the reversing pump. This valve is open in the neutral and forward positions and provides a by-pass in neutral and forward driving conditions, as will become clear from the following description.

The valve V may comprise a block or housing having an angular passage therethrough V—2. Moving across this passage is a slide V—3 having an opening or passageway V—4 therethrough adapted to register with the passageway V—2. A compression spring V—5 acts to urge the slide V—3 in position so that its opening V—4 is in register with the passage V—2. One end of the passage V—2 connects in any appropriate manner with the conduit 24 between the reversing pump and the brake B. The other end of the passage is connected in any suitable manner (not shown) to the reservoir T. Thus, opening of the passage V—2 establishes the by-pass from the reversing pump to the reservoir.

The rod or slide V—3 extends out one end of the block or housing V into a housing or valve casing V—12. This housing may be divided into two parts with an opening or valve seal V—14 therebetween upon which may seat a valve head V—11 affixed upon the end (the left end in Fig. 3) of the slide V—3. One chamber (the left chamber in Fig. 3) of the valve housing V—12 communicates with the forward pump FP and also with the conduit 10 from the cam unit. The other chamber of the casing V—12 communicates by a conduit 42 with the reservoir T. The complete connection is not shown.

From the foregoing it may be understood that when the apparatus is set in the "forward" position, if the forward control pump starts to rotate backward (i. e. when the wheels tend to drive the engine on coasting) the ball-check C—6 will seat immediately and the valve head V—11 will also immediately seat on its seat V—14. Seating of V—11 will close the by-pass valve V automatically. Because the pump is prevented from reverse rotation the wheels of the car (i. e. the driven shaft) maintain a coupling with the engine (the driving shaft) and prevents freewheeling. Also this is the only condition in which the brake can be used to give greater braking action to the engine if desired, as explained below.

An arm V—9 on the slide V—3 is engageable with a pivoted lever 50. The lever 50 and the selector valve lever S9 and the cam lever C2 may be interconnected so as to move in unison into Forward, Neutral or Reverse position by any suitable means, although for convenience of illustration in the diagrammatic showing of Fig. 3 these three parts are shown separately. When the lever 50 is in "forward" or "neutral" positions arm V—9 has no effect on it. But when the lever 50 is moved to "reverse" the slide V—3 is moved to the right and the valve head V—11 is caused to seat on its seat V—14. Thus the by-pass valve is closed.

Whenever the by-pass valve is closed the brake, when actuated, will be operative to slow down the car. Thus, the brake will be inoperative except during reverse operation of the car or in a coasting condition when the wheels tend to drive the engine. Bearing in mind the relative actions of the by-pass valve and the brake, the following conditions may be noted.

V. OPERATION UNDER CERTAIN CONDITIONS (a) when the selector valves is in the "forward" position and the car is rolling down hill with the wheels tending to drive the engine, the brake B is moved manually by B14 in the amount desired to restrict or to close off the brake port B12. That restricts the operation of the reverse control pump RP (the by-pass valve being already closed). However, when the car slows down to a point equivalent to engine speed there will no longer be back pressure in the forward control pump FP to keep the valve head V—11 on its seat V—14. Therefore, spring V—5 unseats that valve V—11 and opens the by-pass V—2, thereupon making the brake inoperative or ineffective.

(b) If the car is parked with the selector valve S in "reverse" position and the brake B in the "parked" position the shaft 116 of the reverse control pump will be held stationary by the ball check C—7 and the brake B. In this condition the car is in direct drive connection with the engine, and will resist rolling forward or backward.

(c) If the car is facing down hill the selector S may be placed in "forward" position and the brake B in "parked" position. In this condition shaft 120 can not rotate in reverse, due to ball check C—6; and the reverse control shaft 116 can not rotate forward due to the brake B and by-pass V (valve V will close automatically due to back pressure in FP). In above condition the wheels would be "locked" against forward motion.

VI. GENERAL OPERATION

The following is a description of the operation of this invention under simple driving conditions when the invention is applied to a common automobile. The selector lever S—9 is placed in neutral and the engine is started as in the conventional automobile. Placing of the selector lever S—9 in that position also causes the levers C—2 and 50 to move into neutral position since all three are connected and move as a unit (the mechanism interconnecting lever S9, cam unit C2, and lever 50, is not shown in the illustration, but may be of any well known system of linkage adapted to the particular installation.) With the engine in idling speed the selector lever may be moved to either forward or reverse position. The engine accelerator is then depressed and the car smoothly begins to move and pick up speed. This is accomplished because the governor pump GP, increasing the pressure in the governor G, causes the governor piston G—3 to partially or completely close the port G—14. Thereupon the pressure in the regulator R is increased by pressure from FP or RP. Such increase causes movement of the piston R—2 against the effort of the spring R—4. The pressure is also transmitted back to the forward or reverse pump depending upon which position the selector lever has been moved into. Thus the load on one or the other of those pumps is increased causing a retarding of its rotation and concomitantly the retardation of either the gear 122 or the reverse control shaft 116. Such retardation causes the increase in speed of the driven gear through the gear mechanism illustrated in Figs. 1 and 2.

The harder the accelerator is depressed, the greater the disproportion between the speed of the engine and of the driving wheels; or, in terms of Figs. 1 and 2, the greater the speed difference between gear 108 and gear 138. The greater this difference in speed between gear 108 and gear 138 the greater the speed and torque resulting in shaft 120 through gears 110a, 110b, 124a, 124b, and 122. This increase in speed and torque of shaft 120 causes a greater output of pump FP which is coupled thereto. The increased output of pump FP is forced to further compress the compression spring R4 of the regulator R. This increased load on the output of pump FP produces a braking effect on the speed of shaft 120. This braking force on shaft 120 is transmitted back through the gear train 124a, 124b, 110a, 110b, 108 and 138 thus producing a compensating increase in R. P. M. of gear 138 and hence the driven shaft 130. The speed of gear 138 increases and gradually approaches the speed of gear 108 as cruising conditions are reached. The nearer the speed of gear 138 approaches the speed of gear 108 the less the torque and speed of shaft 120 and the less the output of pump FP. As minimum driving loads are encountered the torque of shaft 120 and hence the output of pump FP becomes small enough so that the extended compression spring R4 moves the piston R2 to the extreme left position thus blocking all output of pump FP. With pump FP stopped the shaft 120 is held stationary; the transmission is then in its maximum overdrive condition and will remain so until an increase in engine load again changes the relative speeds of gears 138 and 108.

To stop, the accelerator is released and the car is allowed to slow down by the inherent braking action of the idling engine. It may more rapidly be decelerated by the usual foot brake or by the brake embodied in this invention. As previously explained if the brake lever B—5 is moved against the tension of the springs B—7 to cause the piston B—2 to reduce the area of the port B—12, an increase in pressure will be transmitted back to the reverse control pump, the forward control pump being prevented from reverse rotation under such conditions as previously explained.

As the car slows down to a speed of idling, there is no need to shift the selector lever to neutral. It can be left in forward or reverse even when the car is fully stopped. The car will stay at rest on the level as long as the engine is in idling speed. Depression of the accelerator will again start the car in motion.

The car can be shifted from forward to reverse and vice versa regardless of speed, although it is not intended that such a reversal should take place while the car is going at high speed.

Although the invention has been described as applied to the automotive industry, it has adaptability elsewhere. The recent trend to Diesel installations in railroads has developed need for a stepless mechanical transmission. Only in the light Diesel installations has the mechanical transmission been practical. In the heavy duty high speed Diesels the stepped mechanical transmission has not been practical because of the interruption in tractive force during shifting and also due to the huge clutches which were necessary. As a result the newer Diesels are Diesel-electric units. Thus, the principle of this invention could be used in automotive, railroad, marine and industrial fields, wherever a continuously variable mechanical transmission is required in which the gears are constantly in mesh.

Many modifications of my invention will occur to those skilled in the art. Therefore I do not limit it to the specific embodiment illustrated.

I claim:

1. In a hydraulic system for controlling a transmission, a forward speed control pump, a reverse speed control pump, a regulator valve for controlling the speed of said forward and reverse control pumps, a governor pump whose output is directly proportional to engine speed, a governor responsive to changes in output of said governor pump, such changes in output when below a predetermined minimum causing the regulator valve to be ineffective, a manually operable selector valve for selectively directing the output of the forward and reverse control pumps to the regulator valve.

2. In combination with a system as claimed in claim 1 means to independently control the speed of the reverse control pump when the transmission is in a coasting condition in which the driven member of said transmission acts as the driving member.

3. In combination with a system as claimed in claim 1 means to prevent reverse rotation of that control pump whose output is not being controlled.

4. A transmission mechanism comprising a driving gear, a driven gear, gear mechanism connecting said driving and driven gears and in mesh therewith at all times, said connecting mechanism including a forward control shaft carrying a gear which turns therewith, a revolvable reverse control member, gear means rotatably mounted on said member and meshing continuously with said driving and driven gears and also with the said forward control gear, retardation of either said forward control shaft or said reverse control member causing an increase in the speed of the driven shaft, said increase being in the forward direction if the control shaft be retarded or in the reverse direction if the reverse control member be retarded, in combination with a control system comprising forward control means associated with the forward control shaft, reverse control means associated with the reverse control member, means to regulate the operation of the forward and the reverse control means, means to selectively interconnect said regulating means with one or the other of said control means, governor means connected with said regulator and modifying the action thereof in response to changes in speed of said driving shaft.

5. A transmission mechanism as claimed in claim 4, a governor pump the output of which determines at what minimum speed retardation of either the forward control shaft or the reverse control member is possible.

ROBERT H. BAILEY.

REFERENCES CITED

The following references are of record in the file of this patent:

UNITED STATES PATENTS

| Number | Name | Date |
| --- | --- | --- |
| 1,039,743 | Holliday | Oct. 1, 1912 |
| 1,338,767 | Granzow | May 4, 1920 |
| 2,181,118 | Buiner | Nov. 28, 1939 |
| 2,278,351 | Havens | Mar. 31, 1942 |

FOREIGN PATENTS

| Number | Country | Date |
| --- | --- | --- |
| 116,846 | Great Britain | June 27, 1918 |
| 470,412 | France | Sept. 10, 1914 |